US012798228B2

(12) United States Patent
Canto Estany et al.

(10) Patent No.: US 12,798,228 B2
(45) Date of Patent: Nov. 17, 2026

(54) PRINTING ON A GARMENT

(71) Applicant: HEWLETT-PACKARD DEVELOPMENT COMPANY, L.P., Spring, TX (US)

(72) Inventors: Diana Canto Estany, Sant Cugat del Valles (ES); Marina Cantero Lazaro, Sant Cugat del Valles (ES); Maria Isabel Borrell Bayona, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/860,456

(22) PCT Filed: Apr. 28, 2022

(86) PCT No.: PCT/US2022/026811
§ 371 (c)(1),
(2) Date: Oct. 25, 2024

(87) PCT Pub. No.: WO2023/211452
PCT Pub. Date: Nov. 2, 2023

(65) Prior Publication Data
US 2025/0313006 A1 Oct. 9, 2025

(51) Int. Cl.
*B41F 17/00* (2006.01)
*B41F 31/00* (2006.01)
(Continued)

(52) U.S. Cl.
CPC .......... *B41F 17/003* (2013.01); *B41F 31/002* (2013.01); *D06P 1/0096* (2013.01); *D06P 5/2072* (2013.01); *D06P 5/2077* (2013.01)

(58) Field of Classification Search
CPC .... B41F 17/003; B41F 31/002; D06P 1/0096; D06P 5/2072; D06P 5/2077
See application file for complete search history.

(56) References Cited

U.S. PATENT DOCUMENTS 7,419,255 B2 9/2008 Kawaguchi et al.
2001/0019691 A1* 9/2001 Boss .................... B42C 9/0093 412/22

(Continued)

FOREIGN PATENT DOCUMENTS

CN 204309395 U 5/2015
CN 110435308 A 11/2019

(Continued)

OTHER PUBLICATIONS

"Forced Hot Air Drying in DTG Digital Printing", Chiossi e Cavazzuti, available at <https://www.chiossiecavazzuti.com/en/forced-hot-air-drying-dtg-digital-printing/>, Oct. 8, 2021, 3 pages.

*Primary Examiner* — David H Banh
(74) *Attorney, Agent, or Firm* — Jordan IP Law, LLC

(57) ABSTRACT

An example method for printing on a garment is described, comprising placing the garment on a support tray, depositing a first printing fluid on the garment and a second printing fluid on the first printing fluid, and providing heat from the support tray to the garment after depositing the first printing fluid and before depositing the second printing fluid, to dry the first printing fluid at least partially. An example apparatus for direct-to-garment printing is also described, comprising printheads for depositing a first printing fluid and a second printing fluid, and a support tray for the garment, the support tray comprising a heating element.

18 Claims, 6 Drawing Sheets

(51) Int. Cl.
*D06P 1/00* (2006.01)
*D06P 5/20* (2006.01)

(56) References Cited

U.S. PATENT DOCUMENTS

| | | | | |
|---|---|---|---|---|
| 2003/0184248 | A1* | 10/2003 | Muroi | G05B 19/23 318/466 |
| 2003/0222928 | A1* | 12/2003 | Cummins | G11B 23/40 |
| 2005/0174412 | A1* | 8/2005 | Codos | D06P 5/30 347/102 |
| 2006/0186106 | A1* | 8/2006 | Neville | B41M 5/0358 100/92 |
| 2007/0068403 | A1 | 3/2007 | Fresener et al. | |
| 2010/0215856 | A1* | 8/2010 | Kritchman | B33Y 10/00 427/277 |
| 2011/0267410 | A1* | 11/2011 | Yamamoto | B41J 11/0022 347/102 |
| 2012/0256982 | A1* | 10/2012 | Tormo | B41J 11/0022 347/19 |
| 2014/0049590 | A1 | 2/2014 | Tateishi et al. | |
| 2015/0367652 | A1* | 12/2015 | Gracia Verdugo | B41J 11/002 347/16 |
| 2016/0052299 | A1* | 2/2016 | Barberan Latorre | B41J 11/00214 347/102 |
| 2016/0096366 | A1* | 4/2016 | Chen | B29C 69/001 29/890.1 |
| 2016/0193854 | A1 | 7/2016 | Moor et al. | |
| 2016/0297207 | A1* | 10/2016 | Chang | B41J 2/2117 |
| 2017/0253054 | A1 | 9/2017 | Hamada | |
| 2018/0257419 | A1* | 9/2018 | Bi | B41J 11/0022 |
| 2018/0370214 | A1* | 12/2018 | Comb | B33Y 30/00 |
| 2020/0223236 | A1* | 7/2020 | Martinez | B41F 15/18 |
| 2021/0114381 | A1 | 4/2021 | Efendi et al. | |
| 2021/0283910 | A1* | 9/2021 | Chen | B41J 2/1637 |

FOREIGN PATENT DOCUMENTS

| | | | |
|---|---|---|---|
| KR | 10-2115132 | B1 | 5/2020 |
| WO | 2021/076295 | A1 | 4/2021 |
| WO | 2021/087385 | A1 | 5/2021 |

* cited by examiner

PRINTING ON A GARMENT

BACKGROUND

An image may be printed on apparel or garments, such as T-shirts or dresses, using a digital textile printing method which may be referred to as Direct-to-Garment (DTG) printing, in which printing fluid is deposited directly on the garment. DTG printing allows printing designs in multiple colors, with sharp details and is a cost-effective process e.g. for small and medium runs, personalized garments and others.

DTG printing may use water-based printing fluids such as aqueous inks and may obtain high quality images e.g. on natural fibers such as cotton, linen and others. In some cases, e.g. when printing on a dark colored garment, a first printing fluid, such as white ink, may be deposited on the garment as under-base, and then color printing fluids may be deposited on the first printing fluid.

BRIEF DESCRIPTION OF THE DRAWINGS

Some non-limiting examples of the present disclosure will be described in the following with reference to the appended drawings, in which.

DETAILED DESCRIPTION

Figure 1:
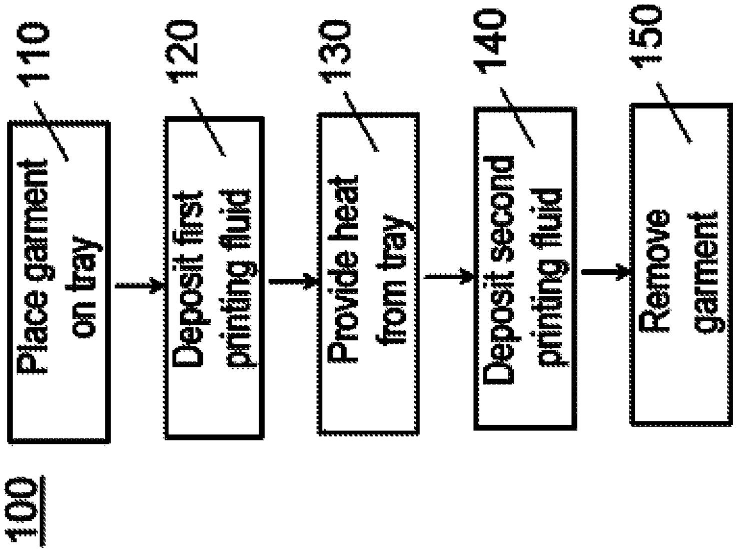
FIGS. 1, 2, 3 and 4 are flow diagrams illustrating example methods for printing on a garment according to the present disclosure.

The present disclosure is related to printing on textiles, for instance for printing on a garment. According to examples presented herein, an image may be formed on a garment, such as for example a T-shirt, by a digital textile printing technology that is referred to in the field of textile printing as Direct-to-Garment printing (DTG printing), in which printing fluid, e.g. droplets of printing fluid, is ejected from printheads directly on the garment. The printing fluid deposited on the garment may then be post-processed to set the printed image (e.g., by applying heat to dry, and/or cure the printing fluid). The DTG denomination refers to “garment”, which may be a T-shirt, dress, or any other wearable, but the same technology and apparatus may serve for printing on any other piece of apparel or textile product.

DTG printing as in implementations disclosed herein allows great flexibility in forming high-quality complex patterns, in several colors, and allows printing on several textile materials, for example on natural fibers such as cotton, linen and others, which are often employed in garments such as T-shirts.

Thermal or piezoelectric inkjet technology printheads, for example, may be used in implementations of methods and apparatus disclosed herein to deposit printing fluids on the garment. Suitable printing fluids for implementations of the present disclosure may be for example printing fluids with colored pigment particles, such as water-based pigment inks, in which colored pigment particles are suspended in an aqueous medium, as well as latex printing fluids, solvent-based printing fluids, or others.

In some cases, for example when printing on a dark fabric, a first printing fluid, such as white ink, may be deposited as an under-base on the garment, and then at least a second printing fluid, such as a printing fluid of a color desired for the image, may be deposited on the first, under-base printing fluid.

In implementations of the present disclosure, the first printing fluid and the second printing fluid may be deposited on a garment in a one-step printing process. By one-step printing process it is meant a process in which the garment is placed in a print zone of a printing apparatus and, before removing the garment from the print zone, the first printing fluid and the second printing fluid are deposited on the garment one over the other, for example from two printheads that are mounted on the same printhead support, e.g., a reciprocating carriage.

In implementations of methods and apparatus according to the present disclosure a printhead deposits a printing fluid in successive swaths, to form a desired image on an area of the garment that is larger than a swath height of the printhead. In such implementations, the garment is not motionless throughout the whole printing process: the one-step printing process in such implementations comprises, after printing each swath, advancing the garment stepwise by a swath distance, within the same print zone, and therefore without removing the garment from the print zone, to successively place different portions of the garment under the printheads.

Such a one-step DTG printing process allows high and efficient throughput and productivity, compared to e.g. two-step DTG printing processes in which the garment is removed from the printing apparatus after the first printing fluid is deposited, and is later loaded to the same or another printing apparatus to deposit the second printing fluid on the first printing fluid; or in which the first printing fluid and the second printing fluid are deposited in the same printing apparatus but in two separate steps, in different printing units, printing stations or print zones, and the garment is displaced from one print zone to another print zone.

High productivity and high image quality may be achieved at the same time, according to examples of the present disclosure, by using a one-step DTG printing process in which heat is provided to the garment from a support tray, to accelerate the drying of the first printing fluid. Furthermore, the curing time once printing is completed may also be reduced, as the printing fluids are partially dried during printing, and thus the time employed in evaporating the liquid content and fixing the printing fluids on the garment may also be reduced.

FIG. 1 illustrates a method 100 for printing on a garment, according to an example of the present disclosure. Method 100 may comprise, at 110, placing the garment on a support tray of a printing apparatus, and at 120 depositing a first printing fluid on the garment, for example a white printing fluid to serve as an under-base for depositing color printing fluids on the garment.

At 130 the method may comprise providing heat from the support tray to the garment, after depositing the first printing fluid, thereby drying, at least partially, the first printing fluid that has been deposited at 120.

By "drying at least partially" is meant that the liquid content of the first printing fluid is decreased by the effect of the heat provided from the support tray to the garment, as this heat causes evaporation of a part of the liquid present in the printing fluid, such as water and/or solvents. The liquid thus evaporates at a faster rate than at room temperature: drying of the first printing fluid is therefore mainly caused and/or accelerated by the supply of heat to the garment from the support tray. The degree of evaporation and therefore the degree to which the first printing fluid is dried in each printing job depends on several factors, such as the composition of the first printing fluid, the printing speed, the amount of first printing fluid deposited, the material and thickness of the garment, the configuration and temperature of the heating element employed, and others. By partially drying the printing fluid, i.e., reducing the liquid contents, the viscosity of the printing fluid is increased, and this has a significant effect on preventing the second printing fluid from mixing with the first printing fluid. This significant effect occurs even if by the application of heat from the support tray the first printing fluid does not reach, before the second fluid is deposited, the same dryness and viscosity obtained after final curing of the printing fluids on the printed garment. In implementations disclosed herein, drying at least partially the first printing fluid may mean decreasing by at least 50% the liquid content of the first printing fluid, i.e., evaporating at least 50% of the water or other liquid of the first printing fluid.

At 140 the method may then comprise depositing a second printing fluid on the first printing fluid that was previously deposited and at least partly dried.

After depositing the second printing fluid, the garment is removed from the support tray at 150. Some implementations may comprise further operations, such as e.g. curing or heating the printing fluids that form the image on the garment in a heat press, oven dryer, calender, or other, before the garment is removed from the support tray at 150.

Heating the first printing fluid and therefore partially drying the first printing fluid before depositing the second printing fluid allows maintaining the high-throughput and productivity of a one-step DTG printing process, while at the same time reducing the risk of coalescence or other artifacts caused by the contact and mixing of the first and second printing fluids, and therefore obtaining high quality images.

Providing heat to the garment from the support tray allows a compact and efficient solution, provides uniform heating of the first printing fluid deposited on the garment and reduces design and space constraints on the printing apparatus.

In example methods and apparatus of the present disclosure, providing heat from the support tray to the garment may comprise activating a heat source mounted on the support tray, for example powering an electrical heat source. Heat may be provided to the garment from the support tray through the contact between the garment and a heated portion of the support tray, e.g. by heating the surface of the support tray on which the garment rests.

Example method 100 may be a one-step DTG printing process, in which the first printing fluid and second printing fluids are deposited on the garment in the same print zone: in other words, the support tray with the garment is not displaced to a different print zone after depositing the first printing fluid and before depositing the second printing fluid.

In implementations of example method 100, while the support tray with the garment remains stationary, e.g. in a print zone of a printing apparatus, at 120 some first printing fluid is deposited on the garment, and simultaneously at 140 some second printing fluid is deposited on first printing fluid that is already on the garment and that has received heat from the support tray at 130. In other words, in such implementations, some second printing fluid may be deposited on portions of the garment on which first printing fluid was previously deposited, and at the same time some first printing fluid may be deposited on other portions of the garment.

Figure 2:
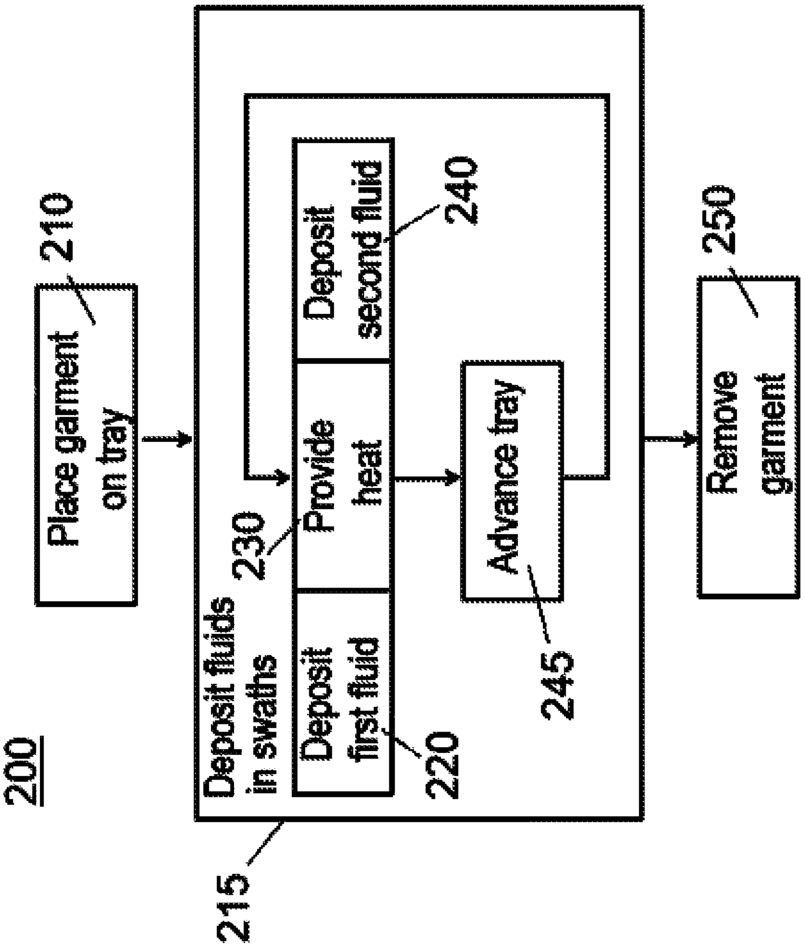

FIG. 2 illustrates an example method 200 according to the present disclosure. The example method 200 may comprise, at 210, placing the garment on a support tray of a printing apparatus; at 215, depositing the first printing fluid and the second printing fluid on the garment in successive swaths; and, at 250, removing the garment from the support tray.

In a swath, example method 200 comprises, at 220, depositing the first printing fluid on the garment; at 230, providing heat from the support tray to the garment, to at least partially dry the first printing fluid deposited at 220; and at 240 depositing the second printing fluid on first printing fluid that was deposited on the garment in a previous swath.

Between two successive swaths, example method 200 comprises, at 245, advancing the support tray a swath distance within the print zone. The number of swaths may depend on the height dimension of each swath, the height dimension of the image to be printed, and the degree of overlap, if any, between successive swaths. In some implementations, the second printing fluid is not deposited during the first swath, as there is no portion of the garment on which the first printing fluid was previously deposited. Similarly, the first printing fluid is not deposited during the last swath, as in this swath the second printing fluid is deposited on the last portion of the garment that has to be printed, which received first printing fluid in the previous swath.

Figure 3:
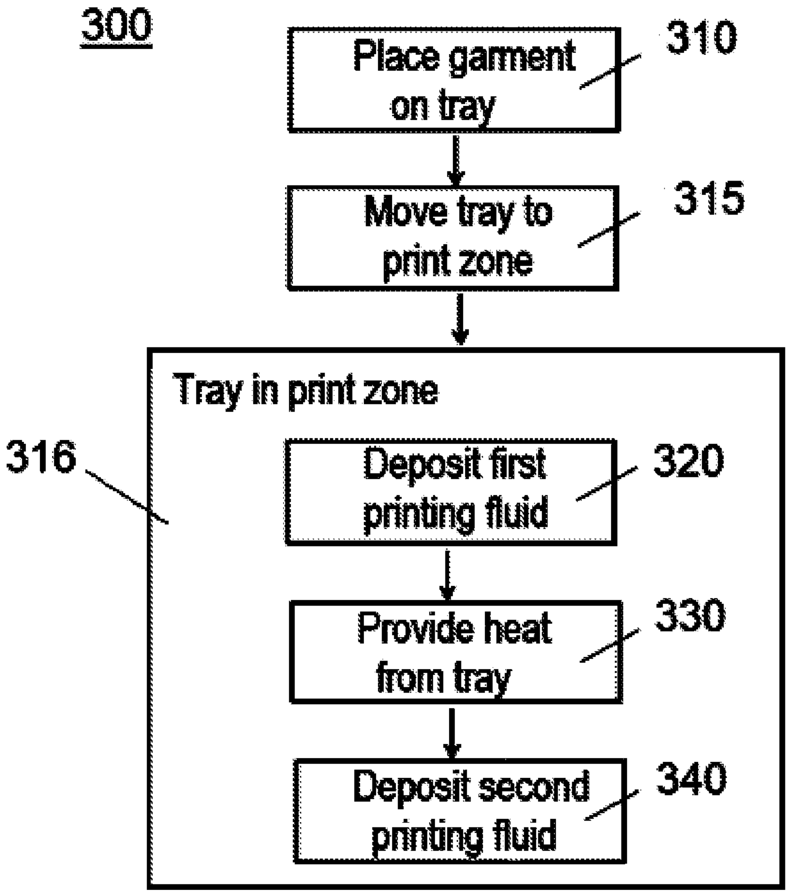

An example method 300 for printing on a garment according to the present disclosure, illustrated in FIG. 3, comprises at 310 placing the garment on a support tray, in a loading zone of a printing apparatus, and then at 315 moving the support tray with the garment from the loading zone to a print zone of the printing apparatus.

The support tray may then remain at 316 in the print zone, where a first printing fluid may be deposited on the garment at 320; heat may be provided from the support tray to the garment at 330, at least in the portion of the garment where the first printing fluid has been deposited; and a second printing fluid may be deposited, at 340, on the first printing fluid that was previously deposited on the garment and at least partially dried by heat provided from the support tray.

Figure 4:
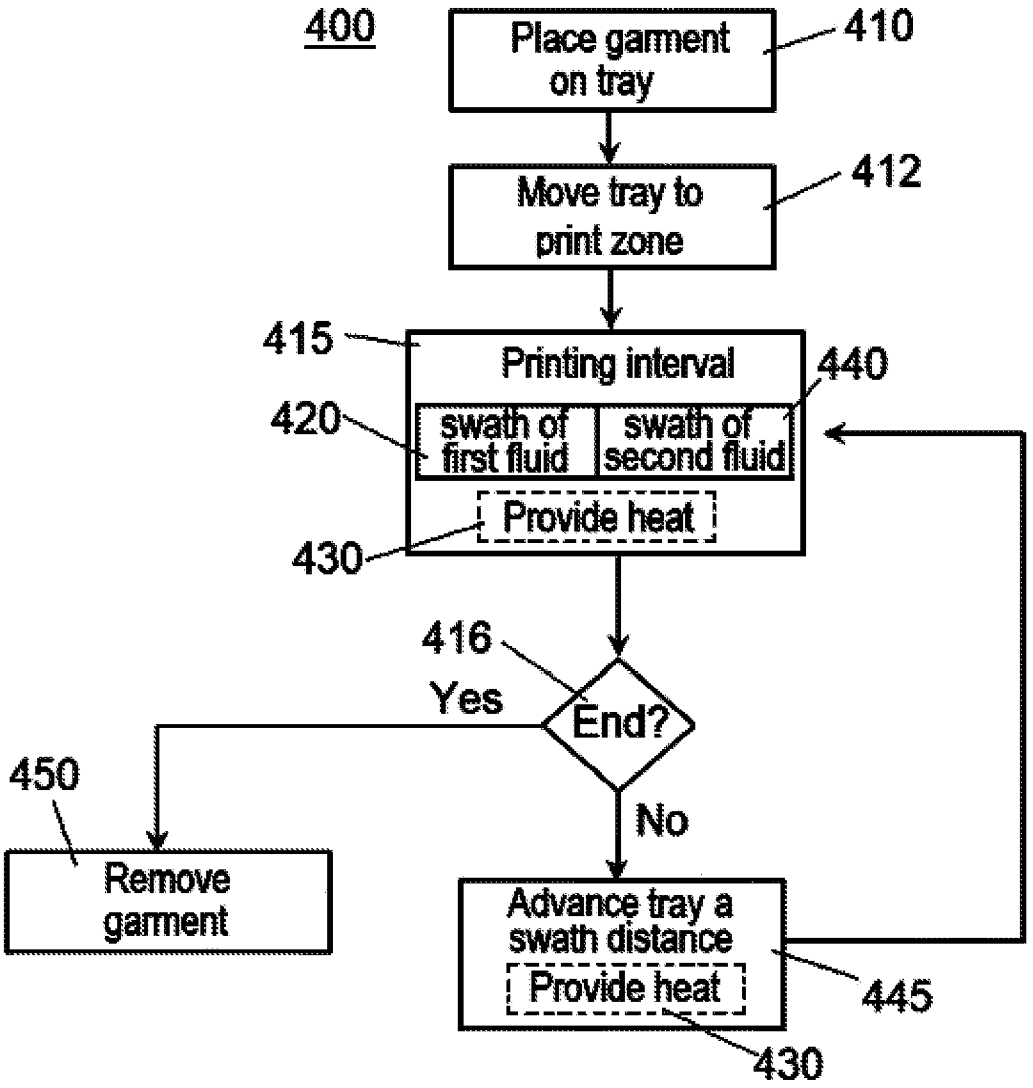

FIG. 4 illustrates an example method 400 according to the present disclosure, wherein printing intervals in which the printing fluid is deposited on a motionless garment may be alternated with advance intervals in which the garment is advanced in the print zone.

In FIG. 4, the garment may be placed on a support tray at 410, for example in a loading zone of a printing apparatus, and at 412 the support tray with the garment may be moved from the loading zone to a print zone, where printheads of the printing apparatus may deposit printing fluids on the garment while the support tray.

In a printing interval at 415, and while the support tray is motionless in the print zone, a swath of first printing fluid may be deposited on the garment at 420, and at the same time a swath of second printing fluid may be deposited on a swath of first printing fluid at 440. In implementations of example method 400, during the printing interval at 415, heat may be provided from the support tray to the garment, at 430, simultaneously with the deposition of first printing fluid and/or second printing fluid. For example, heat may be provided from substantially all the support tray, or it may be provided from the zone of the support tray lying under the zone on which the first printing fluid is being deposited, or it may be provided from the zone of the support tray lying under the zone on which the first printing fluid is being deposited and from the zone of the support tray under the zone on which the second printing fluid is being deposited.

Once a printing interval at 415 is completed, i.e., once a swath of first printing fluid and a swath of second printing fluid have been deposited on the garment, it may be verified, at 416 if the printing process has come to an end, that is, if the image to be printed on the garment is complete.

If the image is not complete, the support tray may be advanced a swath distance during an advance interval, at 445. During an advance interval at 445, no printing fluid is deposited on the garment.

In examples, during the advance interval at 445, heat may be provided from the support tray to the garment at 430. Heat may be provided at 430 under the swath of first printing fluid that has been deposited in the previous printing interval, or under the swaths of the first printing fluid and the second printing fluids that have been deposited in the previous printing interval, or across substantially all the support tray.

After the advance interval at 445, example method 400 may return to block 415, and a new printing interval may start.

This process of alternating printing intervals and advance intervals may be repeated until at 416 it is verified that the printing process has come to an end, that is, that the image to be printed on the garment is complete. The garment may then be removed from the support tray at 450, for example after moving the support tray away from the print zone, for example to a loading position.

In implementations of example method 400, in a printing interval at 415 the second printing fluid may be deposited at 440 on a swath of first printing fluid that was deposited in a previous or earlier printing interval.

Thus, before the second printing fluid is deposited on the first printing fluid, the zone of the garment with the first printing fluid may receive heat from the support tray while it is deposited, and/or during the subsequent advance, and the first printing fluid may be efficiently dried, at least partially, by the effect of this heating. The risk that the first and second printing fluids may mix, affecting the image quality, may thus be reduced.

Furthermore, first printing fluid and second printing fluid may be deposited in a one-step printing operation, simultaneously and in the same printing zone of the printing apparatus, allowing high production rates to be achieved in a compact and cost-effective printing apparatus.

In implementations of example methods 300 and 400, and also of other example methods disclosed herein, such as example method 100 and example method 200 disclosed above, the support tray with the garment may remain stationary in the print zone of a printing apparatus during the process of deposition of the first printing fluid, provision of heat from the support tray to the garment, and deposition of the second printing fluid on the first printing fluid.

By "stationary" support tray, in the present disclosure it is meant that during a process comprising deposition of the first printing fluid, provision of heat from the support tray to the garment, and deposition of the second printing fluid on the first printing fluid, the support tray is not displaced to a different print zone or different area in the apparatus, and during all this process there is at least part of the support tray and of the garment in the print zone. However, for example in implementations of the example methods where the image on the garment is formed in successive printing swaths, the support tray may move, e.g. stepwise, in an advance direction, after each printing swath. By "motionless" support tray, in the present disclosure it is meant that the support tray is not displaced in any direction, as may occur e.g. while the printheads are printing a swath.

By "print zone" in the present disclosure it is meant a zone of a printing apparatus on which the printheads of the apparatus may eject printing fluid: more particularly, it may be a zone formed by two or more parallel bands having substantially the same dimension in a length direction, and arranged adjacent to each other, or partially overlapping, in a height direction: for example, one band may correspond to the zone where a printhead may eject a first printing fluid, and another band may correspond to the zone where another printhead may eject a second printing fluid.

In implementations of example method 100, 200, 300 or 400, heat may be additionally provided from the support tray to the garment before the first printing fluid is deposited, to start increasing the temperature of the garment and assist in drying the first printing fluid once it is deposited. In examples, heat may be provided, for example, to the first portions of the garment intended to receive the first printing fluid, to all the portions of the garment that are intended to be printed, or other.

In some examples, it is also possible to continue providing heat from the support tray to the garment after the second printing fluid is deposited.

In some implementations of example method 100, 200, 300 or 400, heat may be provided continuously, e.g. during the whole process of deposition of the first printing fluid and the second printing fluid on a portion of the garment. In some implementations of example method 100, 200, 300, or 400, heat may be provided intermittently, either with a uniform frequency during the printing operation, or synchronized with certain operations of the printing process. For example, heat may be provided at intervals synchronized with the deposition of the first printing fluid.

In implementations of any of the above example methods 100, 200, 300, 400, the first printing fluid may be a white ink and the second printing fluid may be a color ink. In some implementations, and depending on the image to be printed on the garment, several color printing fluids or color inks may be deposited, e.g. from different printheads, after the first printing fluid is deposited and heat is provided to the garment to at least partially dry the first printing fluid.

Example methods 100, 200, 300, or 400 may be performed in a Direct-to-Garment printer. In particular, they may be performed in any of the example printing apparatus disclosed below with reference to FIGS. 5 to 8.

In implementations, such example methods 100, 200, 300, or 400 may be performed in an inkjet printing apparatus comprising printheads that are mounted on a reciprocating carriage. The first printing fluid may then be ejected from a first printhead and the second printing fluid may be ejected from a second printhead. The reciprocating carriage may displace the first printhead and the second printhead above the print zone of the printing apparatus, in which the support tray with the garment is placed during the printing process.

Implementations of example DTG printing apparatus for printing on a garment according to the present disclosure will be described in the following, with reference to FIGS. 5 to 8. Such example DTG printing apparatus disclosed in the following may be employed for printing on a garment with implementations of example methods 100, 200, 300, 400 disclosed above and variants thereof.

Figure 5:
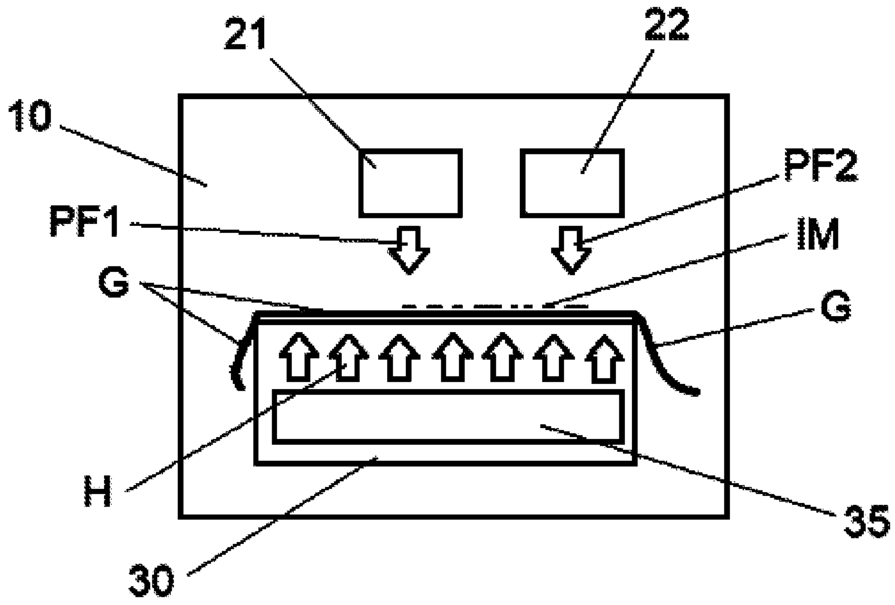
FIG. 5 is a schematic diagram of an example printing apparatus, according to implementations disclosed herein.

FIG. 5 schematically illustrates an example printing apparatus 10, for example, a direct-to-garment (DTG) printing apparatus, which may comprise a first printhead 21 for depositing a first printing fluid PF1 and a second printhead 22 for depositing a second printing fluid PF2, on the first printing fluid PF1, to form an image IM on a garment G, such as a T-shirt. The garment G may be placed in a print zone of the printing apparatus, i.e., a zone under the printheads 21 and 22, or, in the case of a printing apparatus in which the printheads are mounted on a reciprocating carriage, a zone that lies under the path of the reciprocating carriage.

Example printing apparatus 10 may comprise a support tray 30 for supporting the garment G during the printing operation, and the support tray 30 may comprise a heating element 35. The heating element 35 allows providing heat H to the garment from the support tray 30, on which the garment lies, to at least partially dry the first printing fluid: therefore, it may be used to accelerate the drying of the first printing fluid PF1 that is deposited on the garment G, in particular before the second printing fluid PF2 is deposited on the first printing fluid PF1, thereby reducing the risk that the first printing fluid is still wet, i.e. still contains a high proportion of liquid and therefore has a low viscosity, when the second printing fluid PF2 is deposited on it.

In implementations of example printing apparatus 10, the first printhead 21 and the second printhead 22 may be displaceable horizontally, e.g. on a reciprocating carriage, in a direction perpendicular to the plane of the figure in FIG. 5, and the support tray 30 may be displaceable horizontally and in a direction perpendicular to the direction of displacement of the printheads 21 and 22, i.e., from left to right in FIG. 5. This allows the two printheads 21 and 22 to print on the same area of the garment G, such that the second printing fluid PF2 may be deposited on the first printing fluid PF1. In other implementations, the printheads 21 and 22 may be stationary and there may be an array of first printheads 21 and an array of second printheads 22, each array extending to the maximum dimension of an image to be printed on the garment G, in the direction perpendicular to the plane of the figure in FIG. 5.

In implementations, example printing apparatus 10 may print the image IM on the garment G in successive swaths, as described above in relation with implementations of the method. In examples, the first printhead 21 and the second printhead 22 may be positioned in the printing apparatus 10 offset from each other in a direction of advance of the support tray 30 between swaths, such as to deposit the second printing fluid PF2 on the first printing fluid PF1 that was deposited in an earlier swath.

In implementations according to the disclosure, the provision of heat from the support tray 30 to the garment G to at least partly dry the first printing fluid PF1 may allow depositing the second printing fluid PF2 on the first printing fluid PF1 deposited in the immediately previous swath. Thus, the first printhead 21 and the second printhead 22 may be positioned offset but adjacent to each other in the direction of advance of the support tray 30, e.g. leaving no gap between the first printhead 21 and the second printhead 22, in a simple and compact arrangement.

Figure 6:
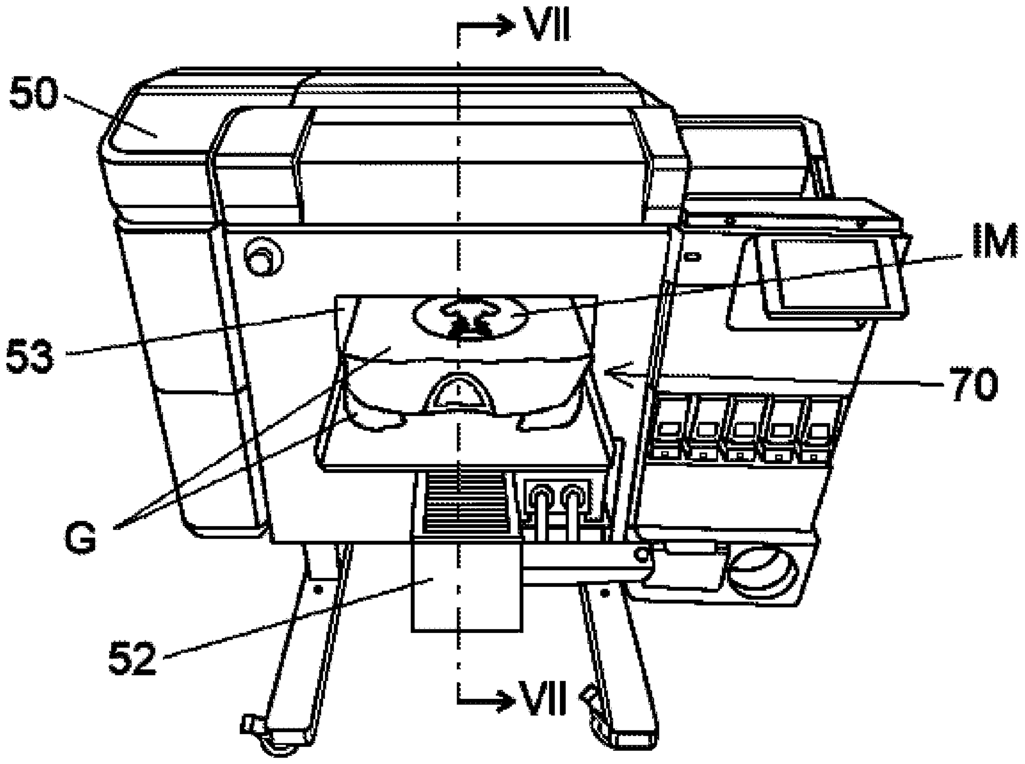
FIG. 6 is a simplified perspective view of an example printing apparatus, according to implementations disclosed herein.
Figure 7:
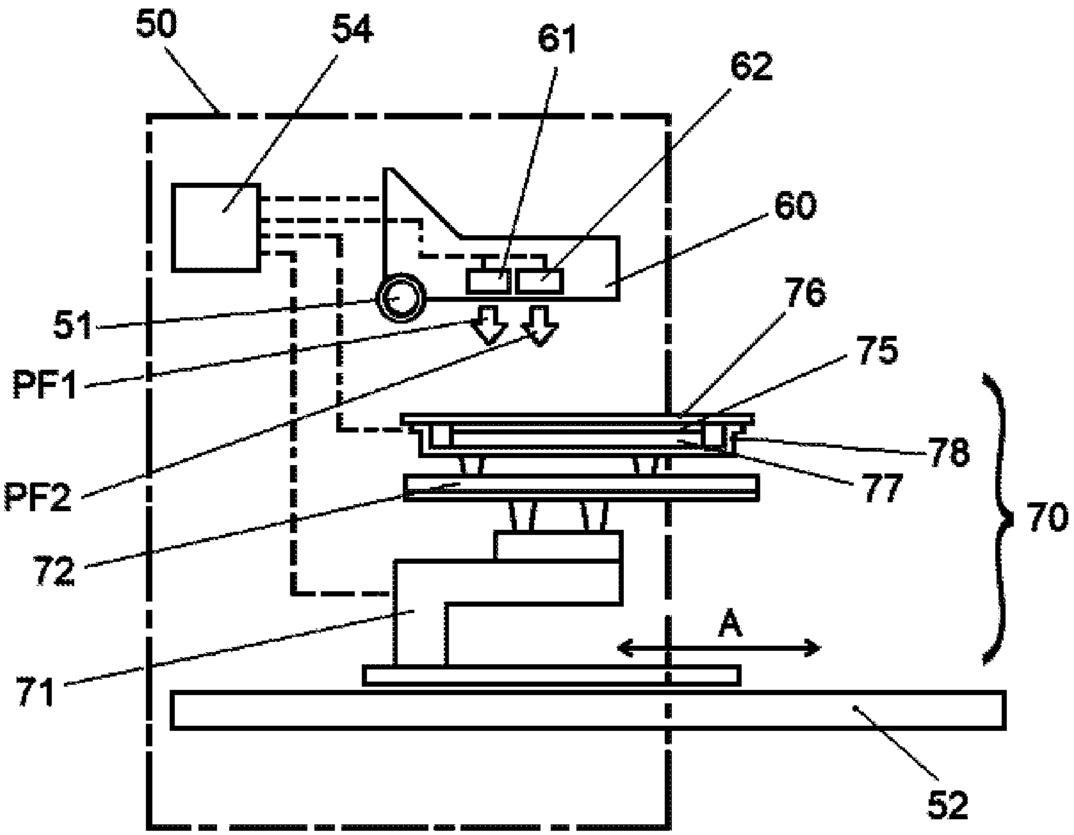
FIG. 7 shows a partial and schematic cross section of an example printing apparatus according to implementations disclosed herein.

In FIGS. 6 and 7, an implementation of an example DTG printing apparatus 50 according to the present disclosure is illustrated. FIG. 7 is a schematic and partial cross-section across plane VII-VII of FIG. 6, showing very schematically part of the features of the example apparatus.

In FIGS. 6 and 7, example apparatus 50 may comprise a reciprocating carriage 60 (not visible in FIG. 6), which may be displaced along a scan axis 51 (not visible in FIG. 6) during printing. Two printheads 61 and 62 may be mounted on the reciprocating carriage 60. In implementations, example printing apparatus 50 may print in successive swaths.

A support tray 70 for a garment G, on which an image IM is to be printed, may be mounted on a guide beam 52 and may be displaced along the guide beam 52, as shown by arrow A in FIG. 7, between one or more printing positions in a print zone within the printing apparatus 50, towards the left in FIG. 6 and FIG. 7, and a garment loading position outside the printing apparatus 50, towards the right in FIG. 6 and FIG. 7. The printing apparatus 50 may comprise an opening 53 for receiving the support tray 70 in a printing position. A printing position may be any position in which a portion of the support tray is in a print zone of the printing apparatus 50, i.e., a zone over which the printheads 61 and 62 are displaceable and may deposit printing fluid, e.g. a swath of printing fluid.

As mentioned above in the case of implementations of printing apparatus 10, in implementations of printing apparatus 50, the first printhead 61 and the second printhead 62 may be mounted on the reciprocating carriage 60 offset from each other and adjacent to each other, e.g. leaving no gap between them, in the direction perpendicular to the scan axis 51; i.e, in the direction of displacement of the support tray 70, such that the second printing fluid PF2 is deposited on the first printing fluid PF1 deposited in the immediately previous swath. The reciprocating carriage 60 may therefore have a compact design.

Implementations of printing apparatus 10 or 50 described above may comprise a controller to operate the apparatus, e.g. to control the first printhead to deposit the first printing fluid and the second printhead to deposit the second printing fluid, and to control the heating element to provide heat from the support tray to the garment.

For instance, some example printing apparatus 50 may comprise a controller 54 (FIG. 7), which, as indicated by dotted lines, may control inter alia the displacement of the reciprocating carriage 60 and the displacement of the support tray 70, the operation of printheads 61 and 62, and the operation of a heating element of the support tray 70, which will be described in detail below.

In implementations of an example printing apparatus 50, the support tray 70 may comprise a heat conductive plate 76, such as a metal plate, which is an upper plate on which the garment G rests; a heating element 75 under the heat conductive plate 76 and in contact therewith, and a heat insulating layer 77 under the heating element 75. This structure allows providing heat from the support tray 70 to the garment G efficiently, e.g. with limited heat losses and low power consumption.

The heating element 75 may be attached to the heat insulating layer, for example, by a layer of adhesive. The assembly comprising the heat conductive plate 76, the heating element 75, and the heat insulating layer 77 may be arranged e.g. on a sheet metal holder 78.

In examples as illustrated in FIG. 7, the support tray 70 may comprise a mounting structure 71 cooperating with guide beam 52 for the displacement of the support tray 70 between the printing positions and the garment loading position. The support tray 70 may comprise in some examples a lower plate 72 on which the parts of the garment G hanging out from the upper plate may rest.

Figure 8:
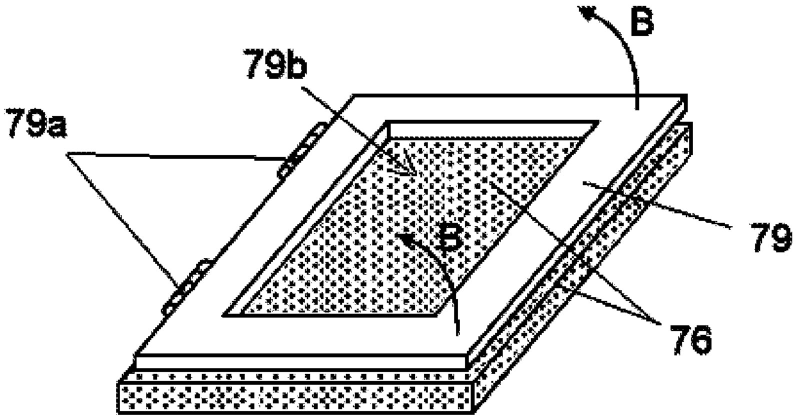
FIG. 8 is a schematic perspective view of an example frame for holding down a garment on an example support tray.

In implementations, the support tray 70 may comprise a frame to hold down the garment G during printing. An example frame 79 is illustrated in FIG. 8, which shows schematically in perspective view a detail of an example support tray 70: an example frame 79 may be attached with hinges 79*a* to one side of the heat conductive plate 76, so it can rotate between a closed position (illustrated in FIG. 8) in which it rests on the garment G and holds it flat on the heat conductive plate 76, and an open position in which it allows loading or removing the garment. The open position is reached by rotating the frame 79 about the hinges 79*a* as illustrated by arrows B. In examples, frame 79 has an outer shape similar to the heat conductive plate 76, and a large internal opening 79*b* to expose the portion of the garment G to be printed.

In implementations, a heating element 35 or 75 of example support trays 30, 70 disclosed above may be an electric heating element. Examples of electric heating elements that may be employed will be disclosed in the following with reference to FIGS. 9 and 10, as applied to support tray 70 of FIGS. 6 and 7. However, such example electric heating elements may also be applied to support tray 10 of FIG. 5.

Figure 9:
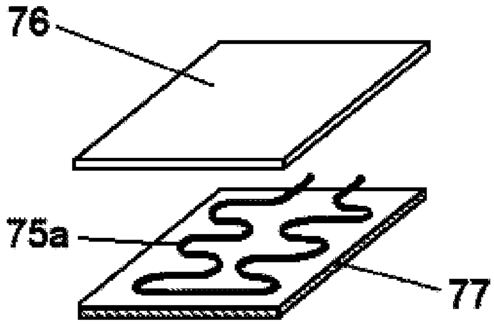
FIG. 9 is a schematic exploded perspective view illustrating part of an example support tray, with an example heating element according to implementations disclosed herein.

FIG. 9 illustrates part of support tray 70, with an example electric heating element which comprises a resistor 75*a*, for example metal or ceramic, extending on a plane parallel to the heat conductive plate 76, between the heat conductive plate 76 and the heat insulating plate 77. The leads of resistor 75*a* may be connected to a power source (not shown) with suitable connectors (not shown). A layer of e.g. silicone or polyamide (not shown) may be between the resistor 75*a* and the heat conductive plate 76, to protect the resistor 76.

Figure 10:
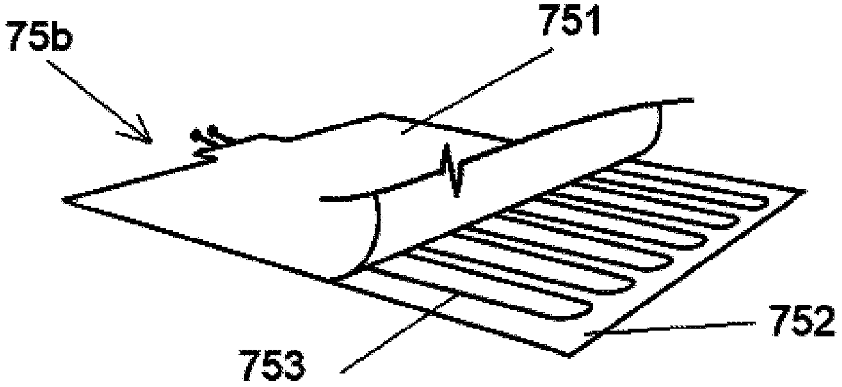
FIG. 10 is a simplified perspective view of an example heating element which may be used in implementations of methods and apparatus disclosed herein.

In some implementations of the present disclosure, an example electric heating element may be a silicone rubber heater 75*b*, an example of which is illustrated in FIG. 10.

In FIG. 10, example silicone rubber heater 75*b* may comprise a laminate with two thin silicone sheets 751 and 752, e.g. of fiberglass-reinforced silicone rubber, and a resistance wire 753 embedded between the two silicone sheets 751, 752. Resistance wire 753 may comprise e.g. wire wound on a fiberglass cord. In FIG. 10 silicone sheet 751 is shown partly stripped off from sheet 752, to show the structure of the laminate.

In examples, silicone rubber heater 75*b* may be an etched foil heater, with chemically etched circuits laminated between the two silicone sheets 751, 752.

Further example electric heating elements which may be employed in implementations according to the present disclosure, and in particular in any of example methods 100, 200, 300, 400 and of example printing apparatus 10 or 50 disclosed above, comprise metallic resistance heating elements of wire or ribbon, straight or coiled, a sheet of electrically resistive material, PTC (Positive temperature coefficient) ceramic or polymer heaters, thick film heaters, or others.

A heating element according to implementations of the present disclosure, such as a examples of heating element 35 or examples of heating element 75, may comprise a layout extending to substantially all the size of the heat conductive plate 76. In some examples, the heating element may be in correspondence with part of the heat conductive plate, e.g. a central portion of the heat conductive plate. In some examples, several heating elements may be provided, and may be controlled to operate jointly or to operate independently from each other, e.g. at different times or with different parameters.

In implementations of example methods 100, 200, 300, 400 and example printing apparatus 10 or 50 disclosed above, the heating element may function to provide a temperature of between 50 C and 100 C to the part of the support tray 30 or 70 in contact with the garment, for example heat conductive plate 76, to at least partly dry the first printing fluid PF1, e.g. white printing fluid, deposited on the garment G, before the second printing fluid PF2 is deposited on the first printing fluid PF1.

In some examples, for instance, an electrical heating element may have a resistance of about 28 Ohm and may be connected to a 240V power source, thus applying a power of about 2060 W to heat the garment from the heat conductive plate.

The present disclosure also refers to a support tray for a direct-to-garment printing apparatus, the support tray comprising a heating element to provide heat to the garment during a printing operation. Such a support tray may be as disclosed above for support trays 30 and 70 in relation to the implementations and examples of FIGS. 5 to 10.

For clarity reasons, not all the elements and details of the apparatus and methods according to the present disclosure are illustrated in the drawings. Furthermore, the drawings are generally schematic and may not be to scale, thus not defining the precise proportions of the illustrated elements.

Although a number of particular implementations and examples have been disclosed herein, other variants and modifications of the disclosed devices and methods are possible. For example, not all the features disclosed herein are included in all the implementations, and implementations comprising other combinations of the features described are also possible.

The invention claimed is:

1. A method for printing on a garment, comprising:

placing the garment on a movable support tray;

depositing a first printing fluid on the garment in a swath;

depositing a second printing fluid on the first printing fluid, before the garment is removed from the support tray; and providing heat from the support tray to the garment only under the swath of the deposited first printing fluid after depositing the first printing fluid and before depositing the second printing fluid, to dry the first printing fluid at least partially.

2. A method according to claim 1, wherein while the support tray is stationary in a print zone, first printing fluid is deposited on the garment and simultaneously second printing fluid is deposited on at least partially dried first printing fluid on the garment.

3. A method according to claim 2, comprising:

depositing first printing fluid and second printing fluid on the garment in successive swaths, wherein in a swath first printing fluid is deposited on the garment and second printing fluid is deposited on first printing fluid that was deposited on the garment in a previous swath; and between successive swaths, advancing the support tray a swath distance within the print zone.

4. A method according to claim 2, comprising depositing the first printing fluid from a first printhead and the second printing fluid from a second printhead, the first printhead and the second printhead being on a reciprocating carriage displaceable over the print zone.

5. A method according to claim 1, comprising providing heat from the support tray to the garment before the first printing fluid is deposited.

6. A method according to claim 1, the first printing fluid being white ink and the second printing fluid being color ink.

7. A method for printing on a garment, comprising:

placing the garment on a movable support tray in a loading zone of a printing apparatus;

moving the support tray with the garment from the loading zone to a print zone of the printing apparatus; and while the support tray with the garment is in the print zone:

depositing a first printing fluid on the garment in a swath;

providing heat from the support tray to the garment only under the swath of the deposited first printing fluid; and depositing a second printing fluid on the first printing fluid.

8. A method according to claim 7, comprising:

alternating printing intervals, during which the support tray is motionless in the print zone and a swath of first printing fluid is deposited on the garment and a swath of second printing fluid is deposited on the first printing fluid, with advance intervals, during which the support tray is advanced a swath distance and no printing fluid is deposited; and in a printing interval, depositing the second printing fluid on first printing fluid that was deposited in a previous printing interval.

9. A direct-to-garment printing apparatus, comprising:

a first printhead for depositing a first printing fluid in a swath;

a second printhead for depositing a second printing fluid on the first printing fluid; and a movable support tray for supporting a garment during depositing of the first printing fluid and of the second printing fluid;

the support tray comprising a heating element to dry at least partly the first printing fluid deposited on the garment only under the swath of the deposited first printing fluid.

10. An apparatus according to claim 9, the support tray comprising a heat conductive plate to be in contact with the garment, and a heat insulating layer, the heating element being between the heat conductive plate and the heat insulating layer.

11. An apparatus according to claim 9, the heating element being an electric heating element.

12. An apparatus according to claim 11, the electric heating element comprising a resistor, the resistor extending on a plane parallel to the heat conductive plate.

13. An apparatus according to claim 11, the electric heating element comprising a silicone rubber heater.

14. An apparatus according to claim 9, the support tray being mounted on a guide and displaceable between a printing position in which the support tray is in a print zone of the apparatus, over which the first printhead and second printhead are displaceable, and a garment loading position in which the support tray is outside the print zone.

15. An apparatus according to claim 9, comprising a reciprocating carriage to displace the first printhead and second printhead above the support tray, the first printhead and the second printhead being mounted on the reciprocating carriage offset from each other and adjacent to each other in a direction perpendicular to a direction of displacement of the carriage.

16. A method according to claim 1, wherein heat is provided only under the swath of the first printing fluid that has been deposited in a previous printing interval or only under the swath of the first printing fluid where the second printing fluid has been deposited on the first printing fluid in the previous printing interval.

17. A method according to claim 7, wherein heat is provided only under the swath of the first printing fluid that has been deposited in a previous printing interval or only under the swath of the first printing fluid where the second printing fluid has been deposited on the first printing fluid in the previous printing interval.

18. An apparatus according to claim 9, wherein heat is provided only under the swath of the first printing fluid that has been deposited in a previous printing interval or only under the swath of the first printing fluid where the second printing fluid has been deposited on the first printing fluid in the previous printing interval.

* * * * *